United States Patent
Bray et al.

(10) Patent No.: US 9,902,438 B2
(45) Date of Patent: Feb. 27, 2018

(54) SELECTIVE CONTROL OF VEHICLE AERODYNAMICS

(71) Applicant: GM GLOBAL TECHNOLOGY OPERATIONS LLC, Detroit, MI (US)

(72) Inventors: Samantha J. Bray, South Bend, NE (US); Joshua R. Auden, Brighton, MI (US); Jason D. Fahland, Fenton, MI (US); David Dominguez, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

(21) Appl. No.: 14/954,229

(22) Filed: Nov. 30, 2015

(65) Prior Publication Data
US 2017/0151984 A1 Jun. 1, 2017

(51) Int. Cl.
*B62D 35/00* (2006.01)
*B62D 37/02* (2006.01)

(52) U.S. Cl.
CPC ......... *B62D 35/007* (2013.01); *B62D 35/005* (2013.01); *B62D 37/02* (2013.01)

(58) Field of Classification Search
CPC .............................. B62D 35/007; B62D 37/02
See application file for complete search history.

(56) References Cited

U.S. PATENT DOCUMENTS

| | | | | |
|---|---|---|---|---|
| 5,356,195 A | * | 10/1994 | Kanda ................. | B62D 35/007 296/146.8 |
| 5,678,884 A | * | 10/1997 | Murkett ................ | B60K 13/02 180/68.1 |
| 5,812,095 A | * | 9/1998 | Adrian ................. | H01Q 1/3275 343/713 |
| 5,934,740 A | * | 8/1999 | Moebius ............. | B62D 35/007 296/180.1 |
| 6,170,904 B1 | * | 1/2001 | Schaedlich ......... | B62D 35/007 180/903 |
| 6,196,620 B1 | * | 3/2001 | Haraway, Jr. ....... | B62D 35/007 180/903 |
| 8,960,770 B2 | * | 2/2015 | De Luca ............. | B62D 35/007 296/180.5 |
| 9,102,366 B1 | * | 8/2015 | Kim .................... | B62D 35/005 |
| 9,381,957 B1 | * | 7/2016 | Auden ................ | B62D 35/007 |
| 9,561,827 B2 | * | 2/2017 | Parry-Williams ...... | B62D 37/02 |

(Continued)

*Primary Examiner* — Mussa A Shaawat
(74) *Attorney, Agent, or Firm* — Quinn IP Law

(57) ABSTRACT

A system is configured to control aerodynamics of a vehicle. The vehicle includes a vehicle body arranged along a longitudinal axis with a first vehicle body end configured to face incident ambient airflow. The system includes an aerodynamic-aid element mounted to the vehicle body and configured to generate a downforce thereon via controlling the incident ambient airflow. The system also includes an adjustable flap arranged at the aerodynamic-aid element. The adjustable flap is configured to shift relative to the aerodynamic-aid element and thereby control movement of the incident ambient airflow relative to the aerodynamic-aid element. The system additionally includes a mechanism configured to vary position of the adjustable flap relative to the aerodynamic-aid element and thereby vary a magnitude of downforce generated by the aerodynamic-aid element.

20 Claims, 4 Drawing Sheets

(56) References Cited

U.S. PATENT DOCUMENTS

| | | | |
|---|---|---|---|
| 2007/0063541 A1* | 3/2007 | Browne | B62D 35/00 296/180.1 |
| 2008/0116717 A1* | 5/2008 | Honeycutt | B62D 35/007 296/180.5 |
| 2013/0238198 A1* | 9/2013 | Prentice | B62D 35/02 701/49 |
| 2015/0232138 A1* | 8/2015 | Parry-Williams | B62D 35/02 296/180.5 |
| 2017/0088193 A1* | 3/2017 | Heil | B62D 35/00 |
| 2017/0092022 A1* | 3/2017 | Heil | B62D 35/005 |

* cited by examiner

SELECTIVE CONTROL OF VEHICLE AERODYNAMICS

TECHNICAL FIELD

The disclosure relates to selective control of vehicle aerodynamics.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds.

The study is typically used to shape vehicle bodywork along with employing dedicated aerodynamic devices for achieving a desired compromise among the above characteristics for specific vehicle use. Additionally, the study of aerodynamics may also be used to achieve downforce in vehicles in order to improve vehicle traction, high speed stability, and cornering.

SUMMARY

A system is configured to control aerodynamics of a vehicle. The vehicle includes a vehicle body arranged along a longitudinal axis with a first vehicle body end configured to face incident ambient airflow. The system includes an aerodynamic-aid element mounted to the vehicle body and configured to generate a downforce thereon via controlling the incident ambient airflow. The system also includes an adjustable flap arranged at the aerodynamic-aid element. The adjustable flap is configured to shift relative to the aerodynamic-aid element and thereby control movement of the incident ambient airflow relative to the aerodynamic-aid element. The system additionally includes a mechanism configured to vary position of the adjustable flap relative to the aerodynamic-aid element and thereby vary a magnitude of downforce generated by the aerodynamic-aid element.

The mechanism may be configured to vary the position of the adjustable flap via pivoting the adjustable flap about an axis. Additionally, the mechanism may include a bias spring configured to exert a force to return the flap to a predetermined position.

The mechanism may be configured to selectively deploy and retract the adjustable flap relative to the aerodynamic-aid element. In such a case, a deployed adjustable flap can be configured to interrupt the movement of the incident ambient airflow relative to the aerodynamic-aid element and thereby decrease the magnitude of downforce generated by the aerodynamic-aid element. On the other hand, a retracted adjustable flap can increase the magnitude of downforce generated by the aerodynamic-aid element.

The system may also include at least one sensor arranged on the vehicle body and configured to detect a vehicle dynamic parameter. The system may additionally include an electronic controller in communication with the at least one sensor and programmed to regulate the mechanism in response to the detected vehicle dynamic parameter.

The at least one sensor may include a first sensor configured to detect a road speed of the vehicle as a first vehicle dynamic parameter and communicate the detected road speed of the vehicle to the electronic controller. Additionally, the at least one sensor may include a second sensor configured to detect a rate of the yaw of the vehicle body as a second vehicle dynamic parameter and communicate the detected yaw rate to the electronic controller.

The vehicle may include a road wheel. Furthermore, the first sensor may be one of a wheel speed sensor configured to detect a rotating speed of the road wheel and a pitot tube configured to detect a velocity of the incident ambient airflow.

The electronic controller may be configured to regulate the mechanism during vehicle cornering in response to the detected yaw rate and the detected road speed of the vehicle to thereby vary a magnitude of an aerodynamic downforce on the vehicle body and control the detected yaw rate. Such regulation of the mechanism may be used to achieve a target dynamic response of the vehicle.

The vehicle may also include a second vehicle body end opposite the first body end. Consequently, the aerodynamic-aid element may be positioned proximate one of the first body end and the second body end.

In the embodiment where the aerodynamic-aid element is positioned proximate the first body end, the aerodynamic-aid element can be configured as an underbody wing.

In the embodiment where the aerodynamic-aid element is positioned proximate the second body end, the aerodynamic-aid element can be configured as a diffuser.

A vehicle employing the above-described system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
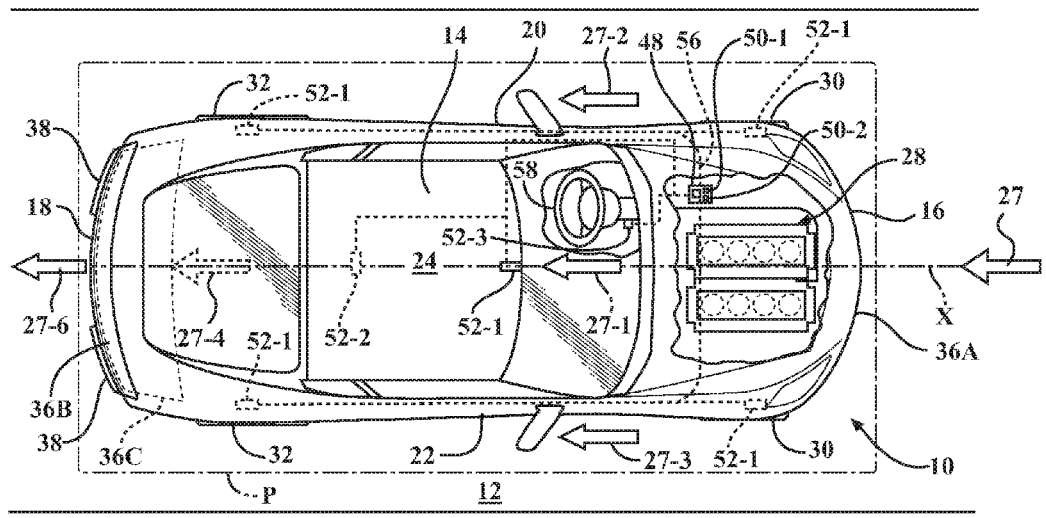
FIG. 1 is a schematic top view of a vehicle having aerodynamic-aid elements and adjustable flaps according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane P that is substantially parallel to the road surface 12. The vehicle body 14 defines six body sides. The six body sides include a first body end or front end 16, a second body end or rear end 18 arranged opposite the front end, a first lateral body side or left side 20, and a second lateral body side or right side 22, a top body portion 24, which may include a vehicle roof, all shown in FIG. 1, and an underbody portion 26, shown in FIG. 4.

The left side 20 and right side 22 are disposed generally parallel to each other and with respect to the longitudinal axis X, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the body 14. As understood by those skilled in the art, the front end 16 is configured to face an oncoming or incident, i.e., approaching and contacting, ambient airflow 27 when the vehicle 10 is in motion relative to the road surface 12. When the vehicle 10 is in motion, the oncoming ambient airflow 27 moves substantially parallel to the body plane P and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in phantom in FIG. 1) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14

The vehicle 10 also includes a plurality of road wheels that include front wheels 30 and rear wheels 32. The vehicle 10 may be configured such that any or each of the road wheels 30, 32 is driven, i.e., receives torque input from the powerplant 28, for propelling the vehicle. As shown, each road wheel 30, 32 may have a pneumatic tire mounted thereon. Specifically, in the case of the four wheeled vehicle 10 shown, a pair of front wheels 30 arranged proximate the front end 16 and a pair of rear wheels 32 arranged proximate the rear end 18. Although four wheels, i.e., a pair of front wheels 30 and a pair of rear wheels 32, are shown in FIG. 1, a vehicle with fewer or greater number of wheels is also envisioned. Although not specifically shown, the vehicle 10 typically includes a suspension system operatively connecting the body 14 to the front and rear wheels 30, 32 for maintaining contact between the wheels and a road surface 12, and for maintaining handling of the vehicle.

Figure 2:
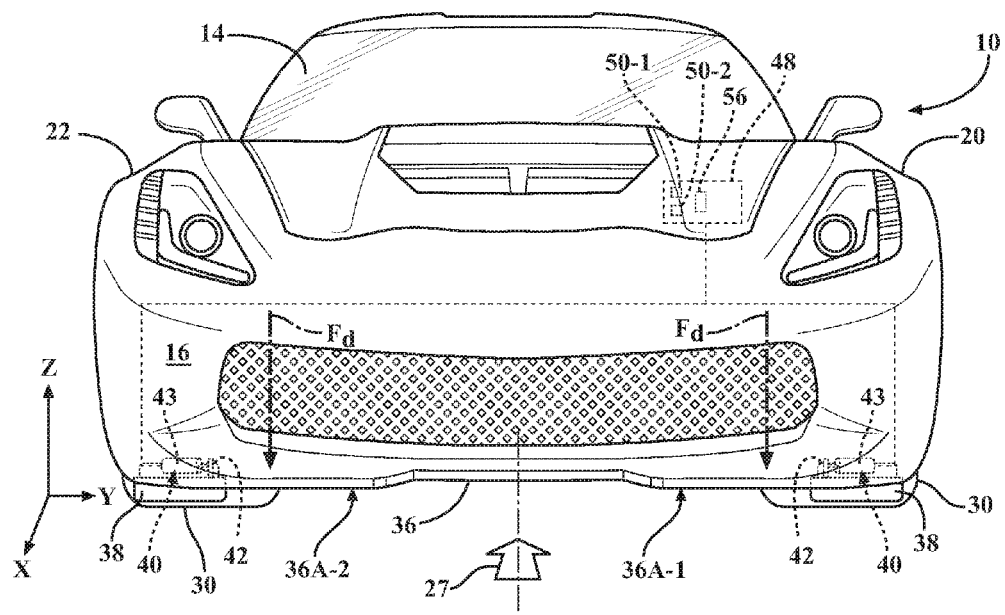
FIG. 2 is a schematic front view of the vehicle shown in FIG. 1, illustrating a particular aerodynamic-aid element at the front end of the vehicle and respective adjustable flaps in a deployed position according to the disclosure.
Figure 5:
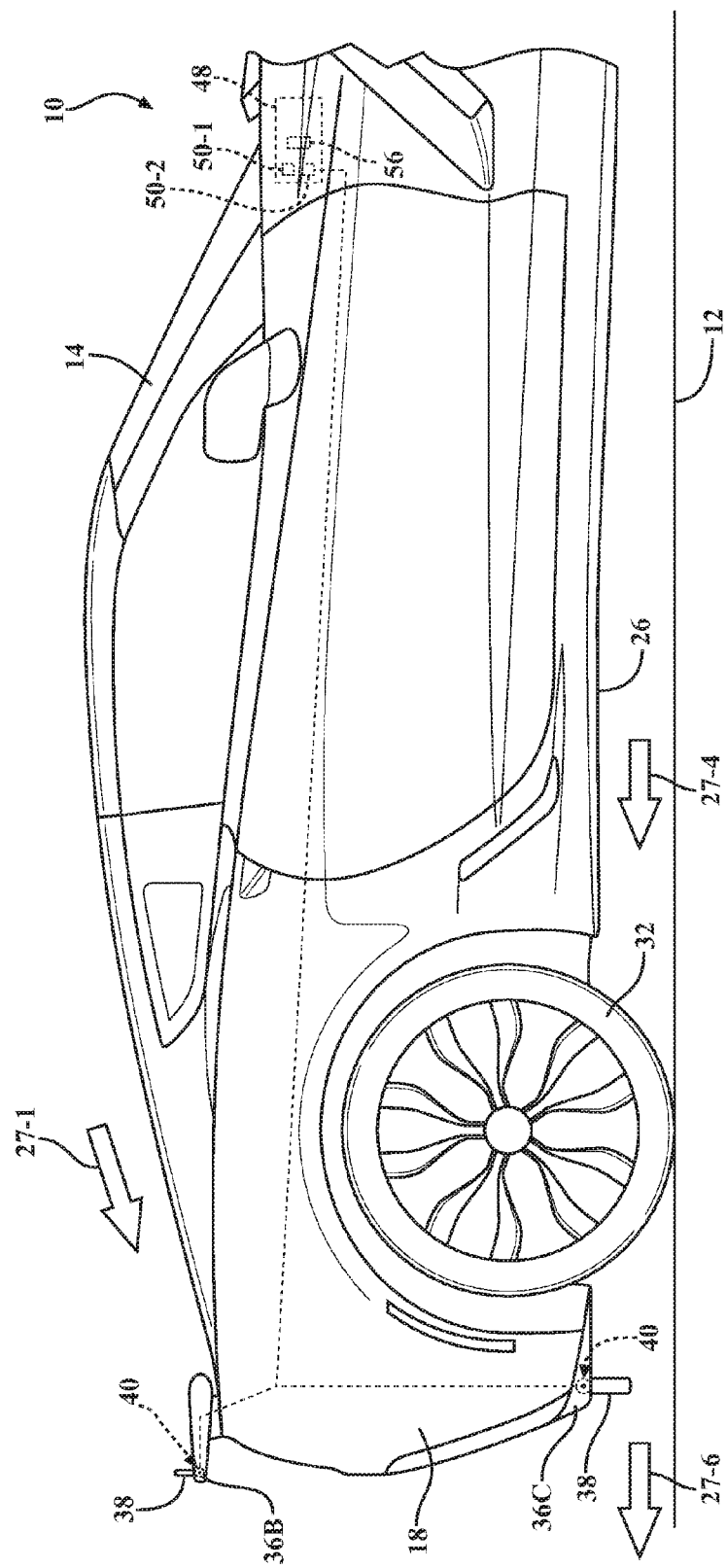
FIG. 5 is a schematic partial side view of the vehicle shown in FIG. 1, illustrating particular aerodynamic-aid elements at the rear end of the vehicle along with respective adjustable flaps in a deployed position according to the disclosure.

The vehicle 10 also includes an aerodynamic-aid element generically shown and identified via a numeral 36 in FIG. 5. The aerodynamic-aid element 36 is mounted to the vehicle body 14. The aerodynamic-aid element 36 can, for example, take the form of a single underbody wing or splitter 36A at the front end 16, as shown in FIG. 1, or, as shown in FIG. 2, may have separate splitter elements 36A-1 and 36A-2 arranged at the front end proximate the left side 20, and the right side 22, respectively. The aerodynamic-aid element 36 can also take the form of a spoiler or wing 36B, or an underbody diffuser 36C arranged at the rear end 18, as shown in FIG. 1. As such, in general, the envisioned aerodynamic-aid elements 36 can be positioned either proximate the front end 16 or the rear end 18 of the vehicle 10.

Each respective aerodynamic-aid element 36 is configured, i.e., shaped and positioned, to control a movement of the ambient airflow 27 relative the vehicle body 14 and vary a downforce FD generated by the airflow thereon. The downforce FD is also known by those skilled in the art as the aerodynamic force applied to the vehicle body 14 that acts in a Z-direction (shown in FIG. 2) normal to the body plane P and counters lift of the vehicle body at elevated road speeds. Specifically, the respective embodiments of the single splitter 36A and the separate splitter elements 36A-1, 36A-2 are configured to control, at the front end 16, movement of the first airflow portion 27-1 passing over the top body portion 24, the second and third airflow portions 27-2, 27-3 passing over the left and the right side 20, 22, and the fourth airflow portion 27-4 passing under the vehicle body 14. Furthermore, at the rear end 18, the wing 36B is generally configured to control movement of the first airflow portion 27-1 and the diffuser 36C is generally configured to control movement of the fourth airflow portion 27-4.

Figure 3:
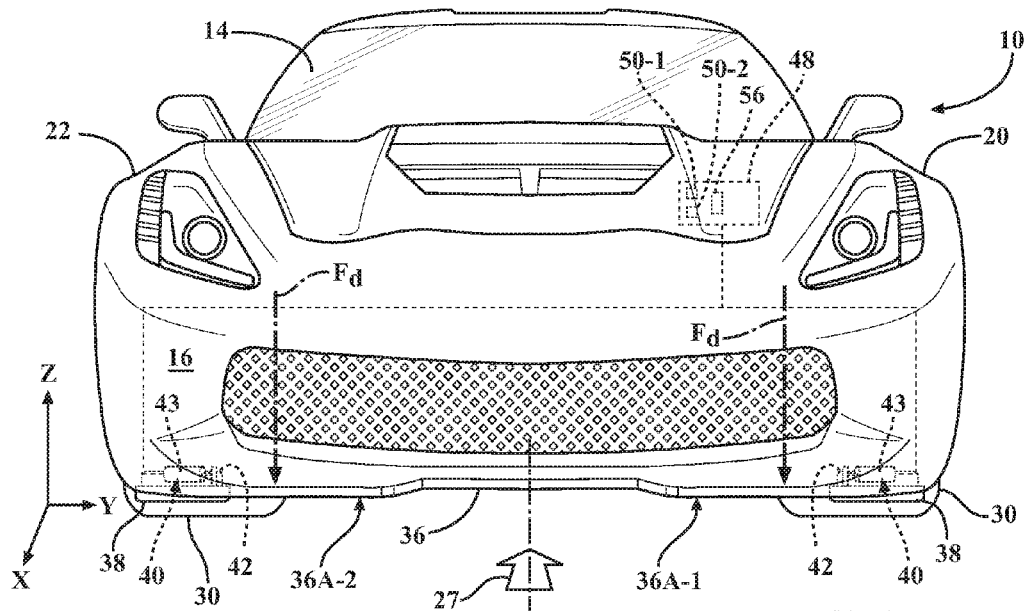
FIG. 3 is a schematic front view of the vehicle shown in FIG. 2, illustrating the aerodynamic-aid element and the respective adjustable flaps in a retracted position according to the disclosure.
Figure 4:
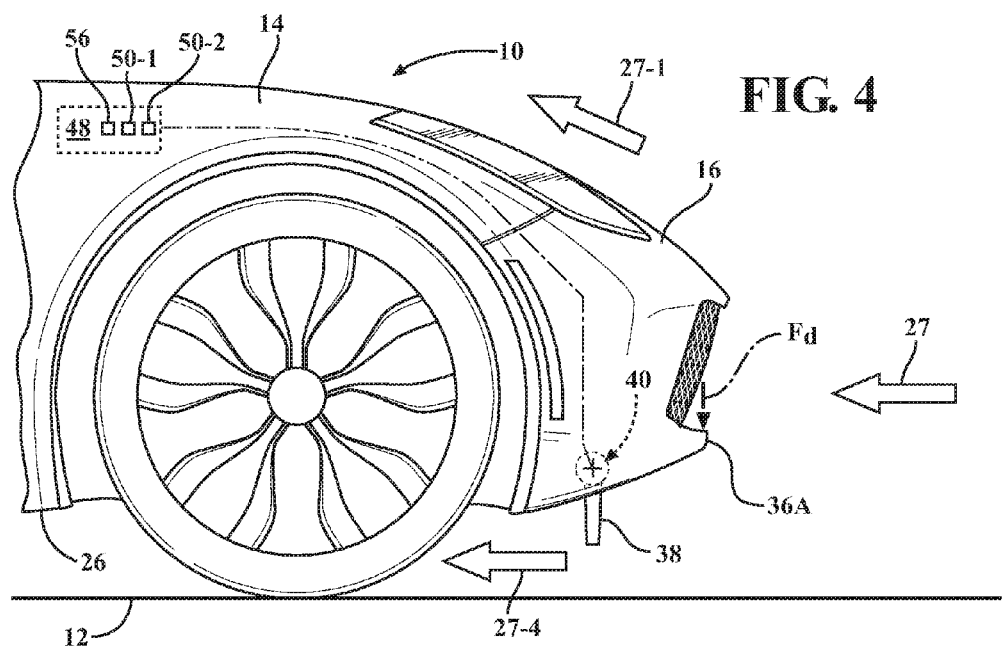
FIG. 4 is a schematic partial side view of the vehicle shown in FIGS. 1-3, illustrating the aerodynamic-aid element at the front end of the vehicle along with the respective adjustable flap in a deployed position according to the disclosure.

The vehicle 10 additionally includes an adjustable flap 38 arranged at the respective aerodynamic-aid element 36 and configured to shift relative thereto. As shown in FIGS. 2 and 3, the adjustable flap 38 can be mounted on the vehicle body 14, proximate to the aerodynamic-aid element 36, or directly to the aerodynamic-aid element, as shown in FIG. 4. The shifting of the adjustable flap 38 is configured to control movement of the incident ambient airflow 27 as defined by its respective first, second, third, and fourth airflow portions 27-1, 27-2, 27-3, and 27-4 relative to the particular aerodynamic-aid element 36. The vehicle 10 additionally includes a separate mechanism 40 configured to vary position of each adjustable flap 38 relative to the particular aerodynamic-aid element 36 and thereby control a movement of the ambient airflow 27 relative the vehicle body 14. As a result, such variation of the position of the particular adjustable flap 38 is configured to vary a magnitude of downforce FD generated by the airflow at the respective aerodynamic-aid element 36.

Specifically, the mechanism 40 can be configured to selectively deploy the adjustable flap 38 into the ambient airflow 27, to thereby selectively block the aerodynamic-aid element 36 from being contacted and traversed by the airflow. The mechanism 40 can also retract the flap 38 out of the ambient airflow 27 to thereby uncover the aerodynamic-aid element 36 for access by the ambient airflow. Accordingly, the deployed adjustable flap 38 interrupts the movement of the incident ambient airflow 27 relative to the aerodynamic-aid element 36 to decrease the magnitude of downforce FD generated by the aerodynamic-aid element 36 and a retracted adjustable flap increases the magnitude of downforce generated by the aerodynamic-aid element.

Figure 6:
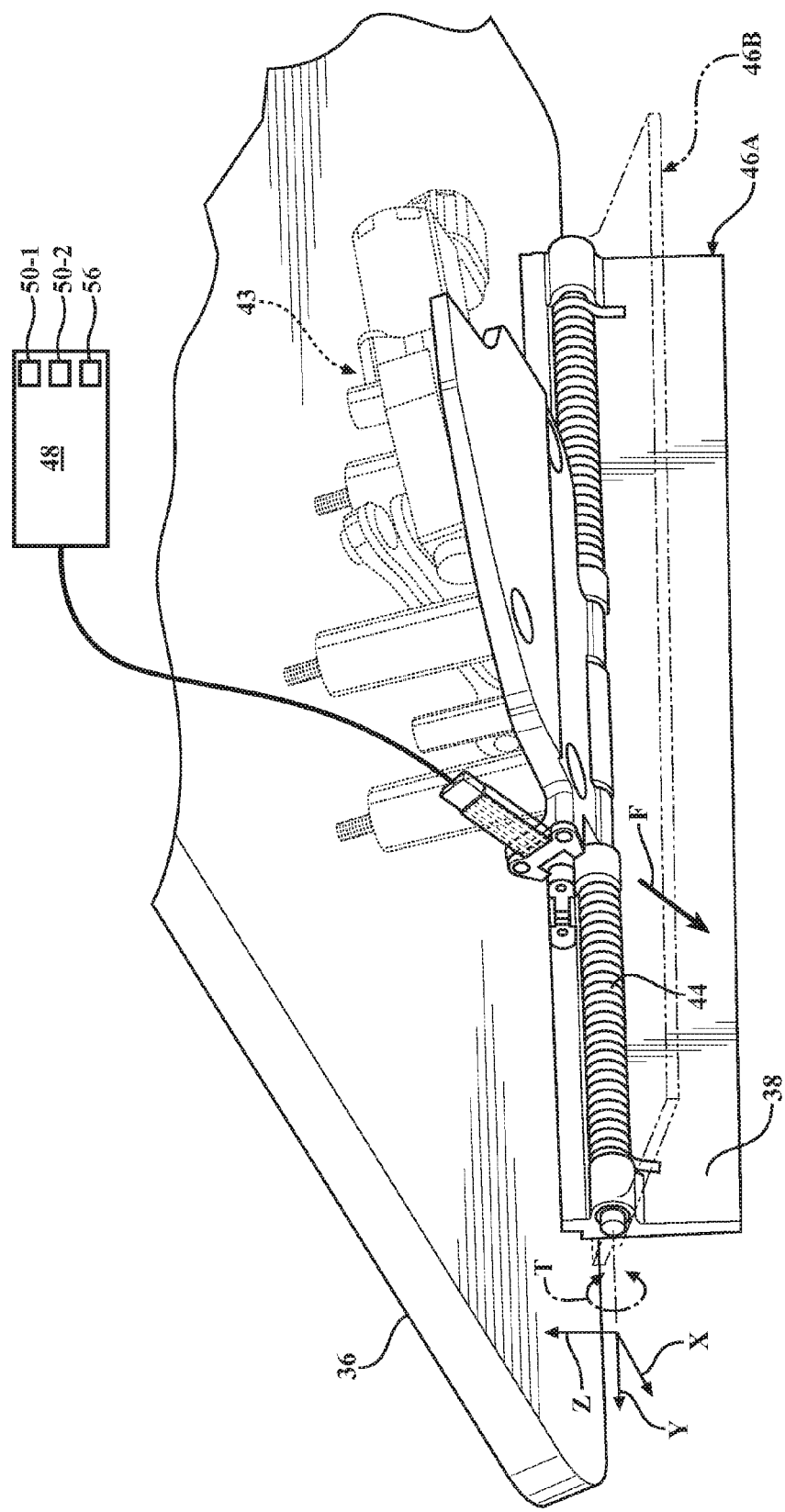
FIG. 6 is a schematic close-up perspective view of the adjustable flap shown in FIGS. 2-4, according to the disclosure.

The mechanism 40 can be configured to vary the position of the adjustable flap 38 via pivoting the flap about an axis Y, wherein the axis Y is substantially perpendicular to the longitudinal vehicle axis X, as shown in FIGS. 2, 3, and 6. Alternatively, the mechanism 40 can be configured to vary the position of the adjustable flap 38 via selectively deploying the flap in a linear direction, perpendicular to the body plane P. Each mechanism 40 can include a suitable device for generating movement of the adjustable flap 38, such as a linear actuator 42 and/or an electric motor 43. As shown in FIG. 6, the mechanism 40 may include a bias spring 44 configured to exert a force F intended to return or preload the flap 38 to a predetermined position. The subject predetermined position of the adjustable flap 38 can be a position designated with numeral 46A, where the flap is deployed into the ambient airflow 27 in order to decrease the magnitude of downforce FD generated by the aerodynamic-aid element 36. The subject predetermined position can also be an opposite position 46B where the adjustable flap 38 is retracted from the ambient airflow to increase the magnitude of downforce FD generated by the aerodynamic-aid element 36. Accordingly, either the position 46A or the position 46B of the flap 38 can serve as the predetermined starting or default state of the flap in the vehicle 10 to thus establish the initial amount of the downforce FD generated by the aerodynamic-aid element 36.

Although not shown, the mechanism 40 can also include a gear drive, such as a reduction gear-set, which may be coupled to the device, such as the linear actuator or electric motor, in order to affect desired movement of the specific adjustable flap 38 relative to the respective aerodynamic-aid element 36. For example, as shown in FIG. 6, the particular mechanism 40 may be configured to apply a torque T opposite the force F exerted by the bias spring 44 to deploy the adjustable flap 38, or, in another embodiment, the mechanism 40 can be configured to apply analogous torque T to retract the adjustable flap 38.

The vehicle 10 may also include an electronic controller 48. According to the disclosure, the controller 48 can be programmed to regulate the mechanism 40 in response to detected vehicle dynamic parameter(s). The controller 48 may include a central processing unit (CPU) configured to regulate operation of the powerplant 28, or a dedicated controller. In order to appropriately control operation of the mechanism 40, the controller 48 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 48 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 48 may also include a floppy disk, a flexible disk, hard disk, magnetic tape, any other magnetic medium, a CD-ROM, DVD, any other optical medium, etc. The controller 48 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 48 or accessible thereby may be stored in the memory and automatically executed to provide the required functionality.

With renewed reference to FIG. 1, the vehicle 10 may also include at least one sensor arranged on the vehicle body 14 and configured to detect the previously described vehicle dynamic parameter(s) and in communication with the controller 48. An example of such vehicle dynamic parameter can be a road speed of the vehicle 10, herein identified as a first vehicle dynamic parameter 50-1. Another representative vehicle dynamic parameter can also be a rate of the yaw of the vehicle body 14, herein identified as a second vehicle dynamic parameter 50-2. A first sensor 52-1 can be configured to detect the road speed of the vehicle 10 and communicate thus detected road speed to the controller 48. Similarly, a second sensor 52-2 can be configured to detect a rate of the yaw of the vehicle body 14 and communicate the detected yaw rate to the controller 48.

The first sensor 52-1 may actually include a plurality of such sensors arranged on the vehicle body 14 for detecting rotating speeds of each road wheel 30, 32 (shown in FIG. 1). Each such first sensor 52-1 may also be configured to communicate the detected rotating speed of the respective road wheel 30, 32 to the controller 48, while the controller may be configured to correlate the signals received from the respective first sensors to the road speed of vehicle 10. Alternatively, the first sensor 52-1 may be a pitot tube configured to detect a velocity of the incident ambient airflow 27 at a specific location relative to the vehicle body 14, and the controller 48 can correlate the detected velocity of the ambient airflow to the road speed of vehicle 10. Additionally, other sensors, for example accelerometer(s) (not shown) configured to detect longitudinal forces, such as encountered during acceleration or braking maneuvers, as well as lateral g-forces acting on the vehicle 10, can be used to communicate such feedback parameters to the controller 48 for regulation of the adjustable flap(s) 38.

The controller 48 can be configured to vary the position of the adjustable flap 38 in order to affect the magnitude of downforce FD generated by the aerodynamic-aid element 36 during cornering of the vehicle 10 in response to the yaw rate detected by the second sensor 52-2. Furthermore, the controller 48 may be configured to vary the position of the adjustable flap 38 in response to the rotating speeds of the road wheels 30, 32 and/or the velocity of the ambient airflow 27 detected via the specific embodiment of the first sensor 52-1. Accordingly, the position of the adjustable flap 38 can be controlled relative to the body plane P proportionately to the yaw rate generated during cornering of the vehicle 10 by activating the mechanism 40. The controller 48 may be programmed with a look-up table 56 establishing correspondence between the vehicle yaw rate, vehicle road speed, and/or velocity of the airflow and appropriate position of the adjustable flap 38 for affecting appropriate regulation of the mechanism 40. The look-up table 56 may be developed empirically during validation and testing of the vehicle 10. As the position of the adjustable flap 38 is varied during the cornering event, the aerodynamic-aid element(s) 36 positioned at the front and/or rear ends 16, 18 is able to use the ambient airflow 27 to exert the appropriate magnitude of downforce FD at the respective end(s) of the vehicle body 14.

The controller 48 may be additionally programmed to determine a slip of the vehicle 10 relative to the road surface 12. The slip of the vehicle 10 may include a measure of how much each of the road wheels 30, 32 has slipped in a direction that is generally perpendicular to the longitudinal vehicle axis X, which identifies that the vehicle has deviated from an intended direction or path along the road surface 12. The intended direction of the vehicle 10 may be identified by a steering wheel angle, which can be detected by a third sensor 52-3 operatively connected to a steering wheel 58 (shown in FIG. 1) and communicated to the controller 48. Furthermore, the controller 48 may be programmed to compare the determined steering wheel angle and yaw rate to determine how much the vehicle has deviated from its intended direction or path.

Additionally, control of the adjustable flap 38 may be employed to maintain contact of the vehicle 10 with the road surface 12 at the front and/or rear ends 16, 18 at elevated road speeds by countering aerodynamic lift of the vehicle body 14 in response to the velocity of ambient airflow 27 detected by the first sensor 52-1. Accordingly, control of the adjustable flap 38 may be employed to aid stability and handling of the vehicle 10 by varying a magnitude of the downforce FD on the vehicle body 14.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system for controlling aerodynamics of a vehicle having a vehicle body arranged along a longitudinal axis with a first vehicle body end configured to face incident ambient airflow, the system comprising:
   an aerodynamic-aid element mounted to the vehicle body and configured to generate a downforce thereon via controlling the incident ambient airflow;
   an adjustable flap arranged at the aerodynamic-aid element and configured to shift relative to the aerodynamic-aid element and thereby control movement of the incident ambient airflow relative to the aerodynamic-aid element; and
   a mechanism configured to vary a position of the adjustable flap relative to the aerodynamic-aid element and thereby vary a magnitude of the downforce generated by the aerodynamic-aid element.

2. The system according to claim 1, wherein the mechanism is configured to vary the position of the flap via pivoting the adjustable flap about an axis, and wherein the mechanism includes a bias spring configured to exert a force to return the adjustable flap to a predetermined position.

3. The system according to claim 1, wherein the mechanism is configured to selectively deploy and retract the adjustable flap relative to the aerodynamic-aid element, and wherein a deployed adjustable flap decreases the magnitude of the downforce generated by the aerodynamic-aid element and a retracted adjustable flap increases the magnitude of the downforce generated by the aerodynamic-aid element.

4. The system according to claim 1, further comprising:
   at least one sensor arranged on the vehicle body and configured to detect a vehicle dynamic parameter; and
   an electronic controller in communication with the at least one sensor and programmed to regulate the mechanism in response to the detected vehicle dynamic parameter.

5. The system according to claim 4, wherein the at least one sensor includes:
   a first sensor configured to detect a road speed of the vehicle as a first vehicle dynamic parameter and communicate the detected road speed of the vehicle to the electronic controller; and
   a second sensor configured to detect a rate of the yaw of the vehicle body as a second vehicle dynamic parameter and communicate the detected yaw rate to the electronic controller.

6. The system according to claim 5, wherein the vehicle includes a road wheel, and wherein the first sensor is one of a wheel speed sensor configured to detect a rotating speed of the road wheel and a pitot tube configured to detect a velocity of the incident ambient airflow.

7. The system according to claim 5, wherein the electronic controller is configured to regulate the mechanism during vehicle cornering in response to the detected yaw rate and the detected road speed of the vehicle, to thereby vary a magnitude of an aerodynamic downforce on the vehicle body and control the detected yaw rate.

8. The system according to claim 1, wherein the vehicle includes a second vehicle body end opposite the first body end, and wherein the aerodynamic-aid element is positioned proximate one of the first body end and the second body end.

9. The system according to claim 8, wherein the aerodynamic-aid element is positioned proximate the first body end, and the aerodynamic-aid element is configured as an underbody wing.

10. The system according to claim 8, wherein the aerodynamic-aid element is positioned proximate the second body end, and the aerodynamic-aid element is configured as a diffuser.

11. A vehicle comprising:
   a vehicle body arranged along a longitudinal axis and having a first vehicle body end configured to face incident ambient airflow;
   an aerodynamic-aid element mounted to the vehicle body and configured to generate a downforce thereon via controlling the incident ambient airflow;
   an adjustable flap arranged at the aerodynamic-aid element and configured to shift relative to the aerodynamic-aid element and thereby control movement of the incident ambient airflow relative to the aerodynamic-aid element; and
   a mechanism configured to vary a position of the adjustable flap relative to the aerodynamic-aid element and thereby vary a magnitude of the downforce generated by the aerodynamic-aid element.

12. The vehicle according to claim 11, wherein the mechanism is configured to vary the position of the adjustable flap via pivoting the adjustable flap about an axis, and wherein the mechanism includes a bias spring configured to exert a force to return the adjustable flap to a predetermined position.

13. The vehicle according to claim 11, wherein the mechanism is configured to selectively deploy and retract the adjustable flap relative to the aerodynamic-aid element, and wherein a deployed adjustable flap decreases the magnitude of the downforce generated by the aerodynamic-aid element and a retracted adjustable flap increases the magnitude of the downforce generated by the aerodynamic-aid element.

14. The vehicle according to claim 11, further comprising:
   at least one sensor arranged on the vehicle body and configured to detect a vehicle dynamic parameter; and
   an electronic controller in communication with the at least one sensor and programmed to regulate the mechanism in response to the detected vehicle dynamic parameter.

15. The vehicle according to claim 14, wherein the at least one sensor includes:
- a first sensor configured to detect a road speed of the vehicle as a first vehicle dynamic parameter and communicate the detected road speed of the vehicle to the electronic controller; and
- a second sensor configured to detect a rate of the yaw of the vehicle body as a second vehicle dynamic parameter and communicate the detected yaw rate to the electronic controller.

16. The vehicle according to claim 15, further comprising a road wheel, wherein the first sensor is one of a wheel speed sensor configured to detect a rotating speed of the road wheel and a pitot tube configured to detect a velocity of the incident ambient airflow.

17. The vehicle according to claim 15, wherein the electronic controller is configured to regulate the mechanism during vehicle cornering in response to the detected yaw rate and the detected road speed of the vehicle, to thereby vary a magnitude of an aerodynamic downforce on the vehicle body and control the detected yaw rate.

18. The vehicle according to claim 11, further comprising a second vehicle body end opposite the first body end, wherein the aerodynamic-aid element is positioned proximate one of the first body end and the second body end.

19. The vehicle according to claim 18, wherein the aerodynamic-aid element is positioned proximate the first body end, the aerodynamic-aid element is configured as an underbody wing.

20. The vehicle according to claim 18, wherein the aerodynamic-aid element is positioned proximate the second body end, and the aerodynamic-aid element is configured as a diffuser.

* * * * *